July 16, 1968 — H. A. ECKHARDT — 3,392,831
SCREW CONVEYOR

Filed Jan. 9, 1967 — 2 Sheets-Sheet 1

INVENTOR.
HANS A. ECKHARDT
BY George B. Aufiero
ATTORNEY

July 16, 1968  H. A. ECKHARDT  3,392,831
SCREW CONVEYOR

Filed Jan. 9, 1967  2 Sheets-Sheet 2

INVENTOR.
HANS A. ECKHARDT
BY George B. ~~~
ATTORNEY

United States Patent Office 3,392,831
Patented July 16, 1968

3,392,831
SCREW CONVEYOR
Hans A. Eckhardt, 55 Crescent Bend,
Allendale, N.J. 07401
Filed Jan. 9, 1967, Ser. No. 608,197
17 Claims. (Cl. 209—81)

ABSTRACT OF THE DISCLOSURE

This invention deals with the problem of removing foreign materials like bolts, nuts, etc. in a screw conveyor. The conveyed material is first fed to an input compartment wherein a removal screw drives the conveyed material past a removal section where undesired foreign material is removed, and then piles the conveyed material towards a throat leading to the main screw.

---

The present invention relates to the field of conveying and feeding particulate materials, and more particularly, to a screw or paddle conveyor wherein foreign particles are removed from the feed material.

A conventional screw conveyor consists of a housing having a screw rotatably mounted therein. When foreign particles like bolts, nuts, etc., have accidentally gotten in such screw conveyor apparatus, severe damage to the screw and housing has resulted. The damage has been even greater, when the apparatus has two or more screws parallel to each other which intermesh.

Many attempts have been made to remove foreign particles from the feed material. One approach is sifting the feed material through a screen or perforated plate before it enters the conveyor. This method works only with well flowing materials, while sticky, tacky or pasty materials are not suitable for this equipment. Furthermore only such foreign particles can be screened out which are larger than the largest particle of the material to be processed. Very often the processed material particle size is large, as with rubber lumps, plastic pellets, ground chips, comminuted plastic film and therefore foreign particles of comparable size can still reach the screw and cause damage.

Another method is the use of a grate magnet above the feed throat. It is obvious that only ferro-magnetic material can be expected to be removed. The chemical and other industries, however, use to a great extent stainless steels, bronze, aluminum and other non-magnetic metals. Bolts, nuts, etc. made of these materials frequently come loose from up-stream equipment and get into the screw apparatus. Furthermore, with many materials magnetized bars obstruct the flow of material too much and therefore cannot be used.

Still another method described in Kiesskalt U.S. Patent 2,148,205 provides a hollow space at the discharge end of the upper of two screws. Foreign particles having entered the upper screw are frequently caught during their travel along the entire length of the screw in the nip between the two counter-rotating screws thus causing severe damage, before they have a chance to reach the space provided for them at the downstream end of that screw.

Another attempt described in Goetz U.S. Patent 2,127,726 provides an escape for tramp metal on top of the screw housing, following the feed throat. Besides the fact that at this point damage already has occurred, the heavy metal parts cannot be expected to travel upward against the law of gravity. A similar device is described in the Nelson U.S. Patent 2,233,707. Proposals along the same lines are made in Carter U.S. Patent 2,186,404 and Guthrie U.S. Patent 2,225,215.

In Freed U.S. Patent 2,455,750 it is pointed out that obstructing objects constitute a hazard as long as they remain above the conveyor screw. It is therefore proposed to provide a vertical wall which guides spikes and other obstructions from the top of the screw around the side to the bottom. While damage may have occurred further upstream, only such large metal parts will be affected which keep protruding out of the screw threads, with somewhat less obstruction foreign particles being conveyed within the screw threads into the closer fitting part of the screw housing where they are known to cause severe damage.

Generally speaking, the present invention contemplates an improvement in a screw conveyor wherein conveyed material is fed to a main screw assembly. According to the inventive concept, an input compartment with upper and lower portions is provided upstream of the main screw assembly; and, this input compartment includes a foreign material removal section in the lower portion thereof. There is a removal screw in the input compartment with threads so disposed as to drive the conveyed material past the removal section and pile said material towards the upper portion of the input compartment. A feed throat is defined between the input compartment upper portion and the main screw so that conveyed material piled in the upper portion will pass through said throat and will be conveyed by the main screw.

The invention and other objects and novel features will be more apparent from the following description taken in connection with the accompanying drawings in which.

Figure 1:
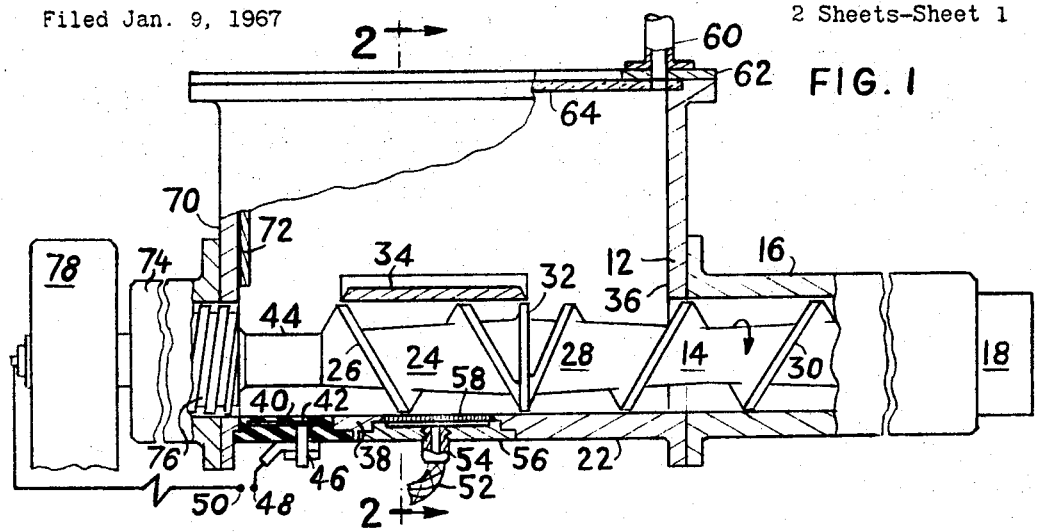
FIGURE 1 is an elevation of one embodiment of the invention showing some features, with parts broken away.
Figure 4:
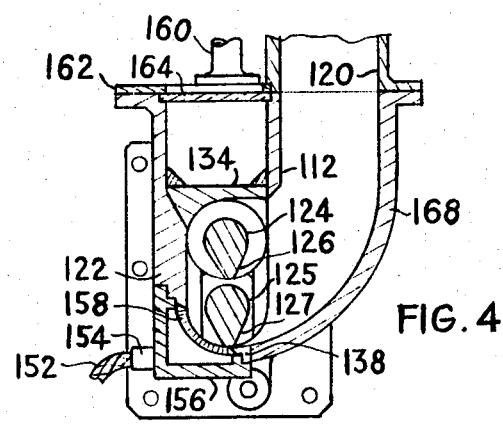
Figure 3:
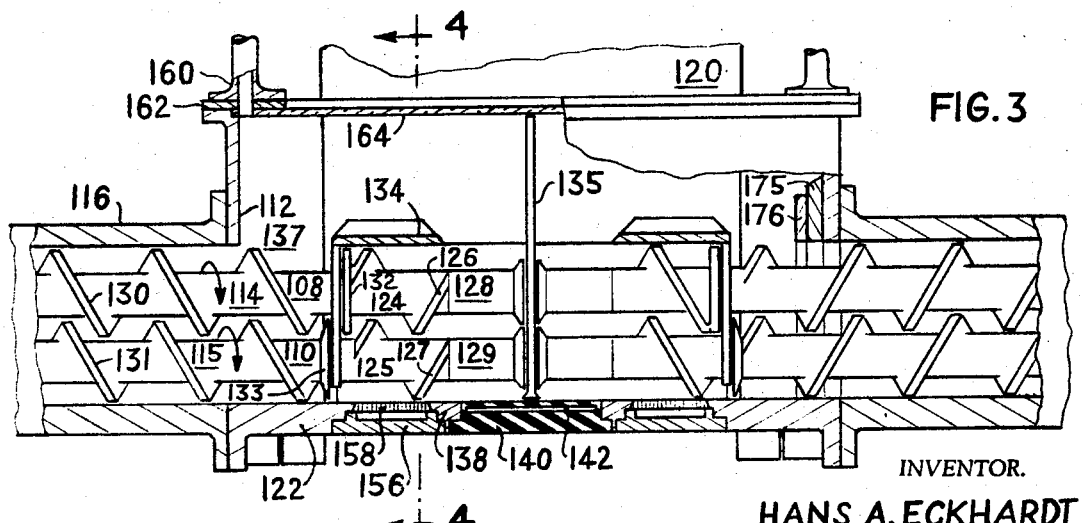
FIGURE 3 illustrates an elevation similar to FIGURE 1 of another embodiment of the present invention, with parts broken away.
Figure 5:
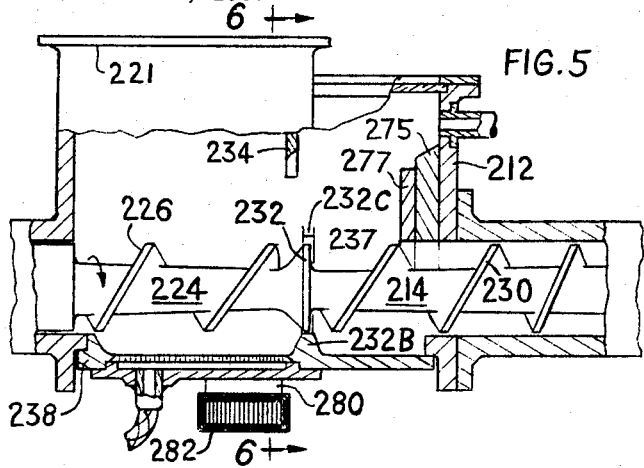
Figure 6:
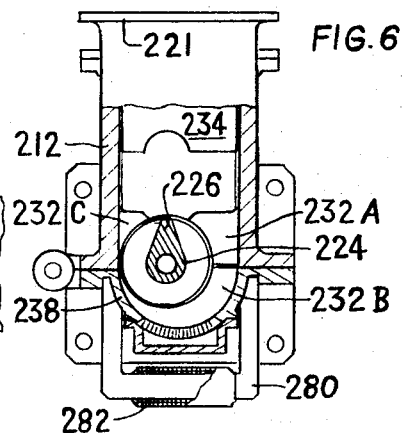
Figure 7:
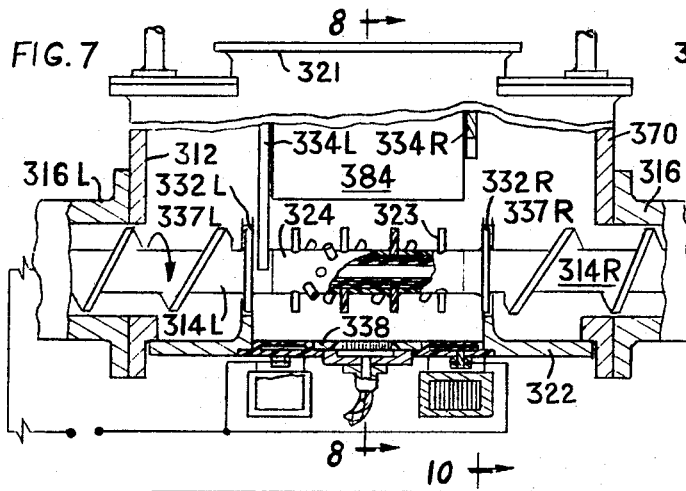
Figure 8:
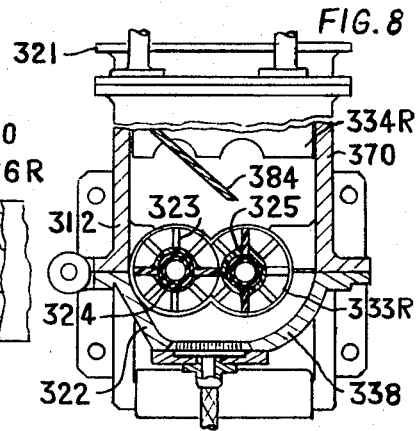
Figure 9:
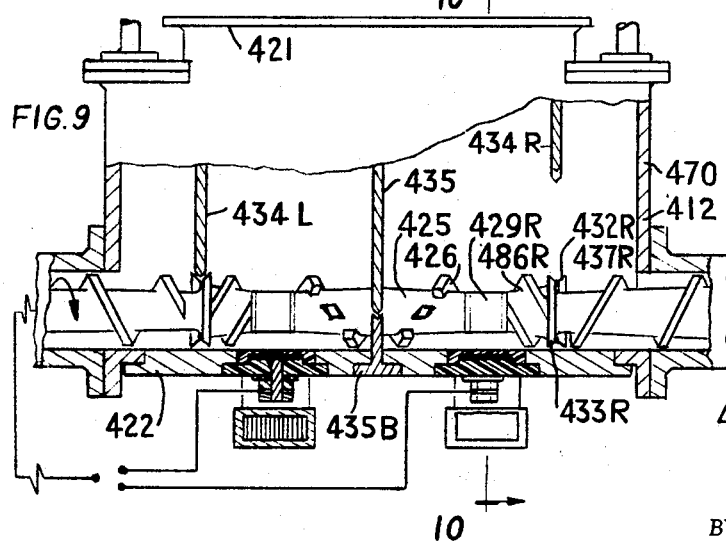
Figure 10:
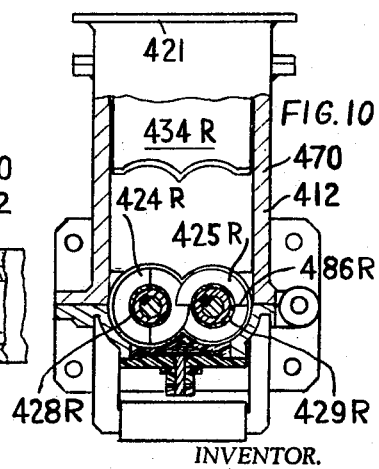

FIGURE 4 likewise shows a cross-section view along lines 4—4 of FIGURE 3;

FIGURE 5 presents still another embodiment shown in an elevation similar to FIGURE 1, with parts broken away; while, FIGURE 6 depicts a cross-sectional view of the embodiment of FIGURE 5 along the line 6—6 thereof;

FIGURE 7 shows an elevation of yet another embodiment of the present invention; and, FIGURE 8 is a cross-sectional view of FIGURE 7 along the lines 8—8 thereof;

FIGURE 9 portrays an elevation of still another embodiment, with parts broken away; while, FIGURE 10 is a cross-sectional view along lines 10—10 of FIGURE 9.

Figure 2:
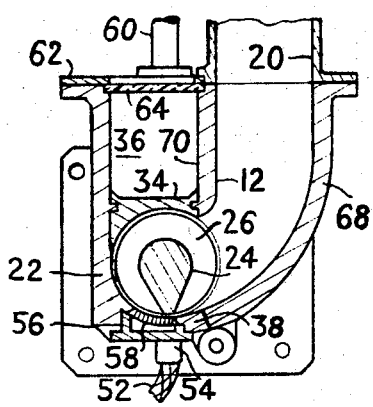
FIGURE 2 shows a cross-sectional view along the lines 2—2 of FIGURE 1.

Referring to the drawings, FIGURES 1 and 2, there is shown a conveyor apparatus which includes an input compartment 12 and a longitudinal main screw 14 carrying material through a screw housing 16 to a discharge zone 18. Material to be conveyed is dropped into the input compartment 12 from a chute 20. Disposed in the input compartment lower portion 22 is a removal screw 24 with the screw threads 26 disposed in a direction contrary to the direction of the threads of main screw 14. Both the main screw 14 and removal screw 24 helically emanate from the same shaft 28, but the screw threads 30 of the main screw are angularly disposed in one direction whereas the screw threads 26 are angularly disposed in the other direction. The two sets of threads 26 and 30 are separated by a collar 32. Disposed over removal screw 24 is a shield 34 cooperating with collar 32. Further downstream, towards screw housing 16 is the end wall 36 of the input section 12. This end wall 36 together with collar 32 and shield 34 determines the amount of material, e.g., powder which can enter the main screw 14 to be carried through screw housing 16 to discharge zone 18. Meanwhile on the lower rearward side of the input compartment 12 is the removal section 38 having embedded in insulating material 40 the electrode 42 which serves to detect foreign particles in the space between electrode 40 and another electrode 44 on removal screw 24. The terminal 46 of electrode 42 is connected to one terminal 48 of a sensing device, while electrode 44 is connected to the other, 50. One convenient method is to measure the change of the capacitance between electrodes 42 and 44 (which latter is on ground potential for practical reasons) caused by foreign particles. For greater sensitivity the center part of electrode 42 can be left without insulation toward electrode 44.

While in FIGURE 1 and in the following figures the sensing device is shown as using a change of the capacitance, many other principles which are based on electricity, magnetism or radiation, can be used.

In FIGURE 1 the flow of material in input section 12 is shown to be improved by applying air pressure and/or vacuum. Air is introduced through hose 52 and its terminal 54 into the space formed between sealing plate 56 and perforated plate 58. Air introduced under pressure will improve the flow of material past removal section 38 and over shield 34 into main screw 14. The air has an exit through pipe 60 which is mounted on a flange 62 holding the transparent plate 64 in place.

If the feed material lends itself to fluidization, pipe 60 can be omitted and the air seeping through porous plate 58 is together with the feed material conveyed by removal screw 24 and main screw 14 to discharge zone 18.

The foreign particles, after detection, can be removed quickly and easily by means of a hinged door 68. This can be done even without interrupting the conveying operation of the main screw 14 if before opening hinged door 68 the flow from chute 20 is shut off, the pile in the input compartment upper portion 70 is moved toward main screw 14, in FIGURE 1 to the right, by a partition 72 adjustable from outside, and the air from hose 52 is shut off. After the quick removal of the foreign particles, partition 72 is moved back into position and flow of material and air is resumed.

The size of the pile can be controlled by axially moving input compartment 12 with screw housing 16 relative to main screw 14 and removal screw 24. If input compartment 12 is moved upstream to the left in FIGURE 1, or the screws downstream, the pile will increase, the throughput decrease, since main screw 14 will be fed in a portion with a smaller volume, smaller pitch and/or depth. At the same time removal screw 24 is fed in a portion with a larger volume, larger pitch and/or larger depth, also tending to increase the material pile. The result of the two effects supporting each other is an increase of the pile with only a small axial movement.

By moving the housing downstream to the right in FIGURE 1, the opposite takes place and as a result of the two supporting effects the pile size decreases, with an increase in throughput.

If, however, the throughput is not to be controlled by such axial movement, as is the case if a stepless variable speed drive is to be used, the distance from collar 32 and shield 34 to end wall 36 is kept longer, and the thread depth and pitch of main screw 14 are kept constant over this distance.

If the throughput is to be increased and decreased by axial movement in a stepless manner, thus avoiding a stepless variable speed drive, without controlling the pile size, main screw 14 would get a thread volume increasing in the same direction as that of removal screw 24, in FIGURE 1 from right to left.

In FIGURE 1 a rear screw housing 74 is shown as containing the sealing screw 76, as well as a gear and thrust box 78 through which common shaft 28 extends.

In the embodiments of FIGURES 3 and 4, the screw conveyor has two intermeshing screws 108, 110, the axes of which are parallel in the vertical plane. An input chute 120 feeds material to an input compartment 112. Through its lower portion 122 extends a pair of removal screws 124, 125. The threads 126, 127 of these screws are shown as being angularly disposed in a direction opposite to that of the threads 130 and 131 of the main screws 114 and 115.

Threads 126 and 127 drive the material upstream past the blank parts 128 and 129 of removal screws 124 and 125 upward along a partition 135, over a shield 134, through a feed throat 137 defined, similar to FIGURE 1, by input compartment 112 and shield 134, into the main screw assembly consisting of the two main screws 114 and 115 and the screw housing 116.

During the upward portion of this travel foreign particles gravitate downward, right and left of the blank parts 128 and 129 and settle at the input compartment lower portion 138 without interference from any screw motion. There they are detected, similar to FIGURE 1, by a sensing device, of which electrode 142 and insulating adapter 140 are shown.

In FIGURES 3 and 4, to improve the flow of material and gravity separation of heavier particles, air is introduced under pressure through a hose 152 and a hose terminal 154 into the space between a sealing plate 156 and a perforated plate 158, similar to FIGURE 1. If the characteristics of the feed material so require, air can leave input compartment 112 through pipe 160 which is mounted on flange 162 holding a transparent plate 164 in place. In contrast, with other feed materials having different flow properties, e.g., those which can be fluidized, it is preferable to close pipe 160 and to let the air carry the feed material into main screws 114, 115 and their screw housing 116.

Foreign particles accumulated at the bottom of removal section 138 can be removed quickly by means of a hinged door 168. This can be done without interrupting the conveying operation of the main screws 114, 115 by shutting off the flow from chute 120 and hose 152 before opening hinged door 168, and by keeping the material above shield 134 from sliding back by means of a partition (not shown) which is movable.

Shield 134 is shown as riding on screws 108 and 110, axially positioned by the collars 132 and 133. Also as riding on the screws is shown partition 135, and both parts are preferably made of polymeric material which is tough, rigid, transparent, dielectric, and which has a low coefficient of friction and a high abrasion resistance.

As shown in FIGURE 3, partition 135 separates the entire screw conveyor into two separate parts, as input chute 120 and input compartment 112 have each a partition in the same plane as partition 135. It is obvious that the above description holds true for the right part as well as for the left part of the screw conveyor. It is also obvious that in this arangement the control of flow and of pile size in the two separate parts by axial movement of screws 108, 110 or of input compartment 112 is not as easy and simple as in the embodiment of FIGURE 1. Therefore, control of flow and pile size is shown as being achieved independently in both parts by inserts 175 and 176 of various thicknesses.

When the screw conveyor is to be used for feeding one material to two different discharge points, partition 135 is preferably omitted. By axial movement of screws 108, 110 or of the input compartment 112 the throughput ratio to the two discharge points can be varied steplessly within a wide range, thus avoiding expensive variable speed drives. In this case the width of input chute 120 has to be essentially smaller than the width between collars 132 from the left to the right half.

FIGURES 5 and 6 show an embodiment suitable for feed materials having flow characteristics which permit the removal screw 224 to have threads 226 angularly disposed in the same direction as the threads 230 of main screw 214. From a chute (not shown) connected to a flange 221 of the input compartment 212, the feed material drops into the removal section 238, through which it is carried by removal screw 224 over the collar 232 through feed throat 237 into main screw 214. The flow and pile of material are shown to be controlled by the adjustable gate 234 and the inserts 275, 277.

In this embodiment, removal screw 224 has threads 226 extending essentially over its entire length. Space for accumulating foreign particles is provided by having the removal section 238 recessed to the bottom and to the side from the periphery of threads 226. Collar 232 is supplemented by the protrusions 232A, B and C from input compartment 212.

Gravity separation of the heavier particles is improved by introducing air under pressure, as in the preceding embodiments. In addition ferro-magnetic particles are retained by magnetic means, indicated by a magnet 280 and its winding 282, in which case all parts in or attached to the lower portion of input compartment 212 are preferably made of non-magnetic materials, to obtain a strong magnetic field across that portion. Similar magnetic means can be used intermittently or permanently to detect an accumulation of ferro-magnetic particles by signalling a change in inductance.

FIGURES 7 and 8 show an embodiment where the feed material drops from a chute (not shown) connected to flange 321 of input compartment 312, between the adjustable gates 334L, 334R over a baffle 384 into the removal section 338. There two intermeshing removal screws 324, 325, when rotating in the same direction and as shown, drive the feed material to the right, up over collars 332R and 333R into the input compartment upper portion 370, from where it drops through feed throat 337R into the main screw assembly, consisting of main screws 314R and 315R and screw housing 316R. While the left gate 334L is in the closed position, the right gate 334R is open and is adjustable to control the pile of material and the flow to the feed throat 337R defined between collars 332R, 333R and input compartment 312.

In FIGURES 7 and 8, the removal screws 324 and 325 have their threads interrupted in the form of bars or pins 323, instead of being continuously helical. Generally speaking, the threads of the removal or main screws in any embodiment may be made discontinuous, e.g., into the shape of paddles, bars, rods or pins, whenever advantageous for handling feed materials with given properties, or for achieving certain objectives, e.g., mixing or breaking up lumps.

As the two screws rotate in the same direction, as indicated by arrows, it is advantageous to have the input compartment lower portion 322 recessed below both removal screws 324, 325 and main screws 314R and L, 315R and L. The recess to the side can be shaped large as shown adjacent to removal screw 325, or very small as shown next to removal screw 324. In any case the collars 332R and L, 333R and L are supplemented by protrusions from input compartment 312 as described before. Also the means shown for aeration, foreign particle detection, magnetic separation correspond to those described with preceding embodiments.

Distinctively, however, the embodiment of FIGURE 8 shows that the flow of feed material from the center to the right can be instantly reversed to the left, by reversing the direction of rotation of removal screws 324, 325 and of main screws 314R and L, 315R and L, and by opening gate 334L and closing gate 334R.

In the embodiment shown in FIGURES 9 and 10, feed material drops through two chutes (not shown) connected to flange 421 into input compartment 412 which leads material coming from the left chute between the gate 434L and partition 435, and material from the right chute between the partition 435 and gate 434R. In the right half of input compartment 412, the two intermeshing counter-rotating removal screws 424R and 425R have interrupted threads 426 in a first section to drive the material to blank sections 428R and 429R, which are equipped with part of a sensing device (not shown) and which provide space for foreign particles to accumulate. The reversed threads 486R push the material away from the collars 432R and 433R to make it pile up over blank sections 428R, 429R into the input compartment upper portion 470 until it slides over collars 432R, 433R through the feed throat 437R into main screws 414R and 415R. The flow can be controlled by adjusting gate 434R.

What has now been described for the right half of the screw conveyor, takes place correspondingly in the left half. As a result, the screw conveyor may be used for feeding two different materials from the center, one to the right, the other to the left, each flow controlled separately and independently. It is obvious that the conveyor apparatus can also be used for feeding one and the same material from the center in two different directions, each separately and independently controlled, after removing the partition 435 and its bottom 435B, the latter being replaced by an adaptor conforming with the inner surface of the input compartment lower portion 422.

FIGURES 9 and 10 also show means for foreign particle detection and removal, magnetic separation and aeration which have been described in preceding embodiments.

In various embodiments described, the input compartments are provided with means for introducing air or other gases into the feed material conveyed therein. While they are shown with pipes for inlet and outlet of the gases, it is understood that larger ducts can be provided instead.

The gas outlet ducts are at least partially closed or entirely omitted, if the introduced gases are to be conveyed partially or entirely by the main screws. Whenever the gases are to be removed before entering the main screw assemblies, consisting of main screws and screw housings, the gas outlet ducts are open; they can be connected to dust collectors of the cyclone or any other type, where the fines carried by the gases are separated from the gases. If a sizing operation by trapping the fines is not desirable these separated fines can be recycled back to the main stream at the feed throats, or through feed openings in the screw housings or at any other suitable location upstream or downstream; furthermore, dust filters at the connections of the gas outlet ducts to the input compartments will aid in retaining the fines.

In various embodiments described, the gases are introduced through ducts under pressure. It is understood that the inlet pressure can be supplemented, if not entirely substituted, by applying negative pressure (suction) from the gas outlets by a fan or other suitable means. Frequently this is of advantage, if the gases before entering through the inlet ducts are heated or cooled, dried or moistened, or otherwise preconditioned, in order to heat or cool, dry or moisten, or otherwise treat the feed material.

While often air will be used, other gases will be applied when certain reactions are to be performed or prevented respectively, such as reducing, oxidizing, calcining, activating, purging with inert gas, or other operations.

In order to improve the flow of the gases and of the feed material, various types of baffles can be used. They are not described in the various embodiments in order not to obstruct the illustrations.

In the various figures, surfaces are shown to be provided for sealing against gases as well as the feed material. The seals, however, are not shown, because of their size, and for better clarity. Also not shown are bolts, screws and nuts to connect parts shown as being provided with flanges for such connections.

In various embodiments, apparatus with one or two parallel screws are described, while it is understood that the same principle can be applied to conveyors with more than two screws or paddle rotors. Furthermore, it is obvious that the screw axes are not necessarily horizontal, as shown in various figures, but may have practically any angle of inclination. While the figure descriptions also show multiple screws either one above each other, or side by side parallel, it is clearly understood that a screw may be disposed in relation to the next adjacent screw under any angle.

Although the present invention has been described in connection with preferred embodiments, it is to be understood that modifications and variations may be resorted to without departing from the spirit and scope of the invention as those skilled in the art will readily undersand. Such modifications and variations are considered to be within the purview and scope of the invention and appended claims.

I claim:

1. In a screw conveyor wherein conveyed material is fed to a main screw assembly, the improvement therein comprising, an input compartment with upper and lower portions upstream of the main screw assembly; a foreign material removal section in said input compartment lower portion; a removal screw in the input compartment with threads so disposed as to drive the conveyed material past the removal section and pile said material towards the upper portion of said input compartment; and, a feed throat between said input compartment upper portion and the main screw so that conveyed material piled in said upper portion will pass through said throat and will be conveyed by the main screw.

2. A screw conveyor as claimed in claim 1, wherein a collar is located between the main screw and the removal screw.

3. A screw conveyor as claimed in claim 2, wherein the threads of at least part of the removal screw are disposed in opposite direction of the main screw.

4. A screw conveyor as claimed in claim 2, wherein at least part of the length of the removal screw has a bare root, to provide space for the removed particles.

5. A screw conveyor as claimed in claim 2, wherein at least part of the input compartment lower portion is recessed so as to form an accumulating space for removed particles.

6. A screw conveyor as claimed in claim 2, wherein at least part of the input compartment lower section is mounted by a hinged connection, for quick detachment and fast removal of accumulated foreign particles.

7. A screw conveyor as claimed in claim 3, said main screw having a common axis with the removal screw and the collar, said main and removal screws being separated by said collar, a shield partly over the removal screw, the removal section and the removal screw extending rearward from said collar, an end wall towards the downstream side of said input compartment; and an input chute connected to the lower portion of said input compartment so that therethrough material enters the lower portion of the input comparment and the removal screw therein, is driven through and out of the removal section, over the shield, and falls downstream towards the main screw, said end wall, collar and shield defining said throat.

8. A screw conveyor as claimed in claim 2, wherein the main and removal screws are movable along their axes relative to the input compartment, increasing the flow and the pile of material by exposing larger thread volumes on the main and removal screws to the feed material, decreasing the flow and pile of material by exposing smaller thread volumes of the main and removal screws.

9. A screw conveyor as claimed in claim 2, wherein a gate towards the downstream side of the input compartment is adjustable relative to the collar to control the flow of material to the main screw.

10. A screw conveyor is claimed in claim 2, wherein inserts which surround with their inner surfaces part of the main screw, are mounted at the end wall of the input compartment to control the pile and the flow of material entering the main screw.

11. A screw conveyor as claimed in claim 2, wherein at least part of the input compartment is provided with means for introducing gases into the material conveyed therein.

12. A screw conveyor as claimed in claim 2 wherein at least part of the input compartment lower portion is provided with magnetic means to pull and retain magnetic particles in the removal section.

13. A screw conveyor as claimed in claim 2, wherein the removal screw carries one part, and the lower portion of the input compartment another part of a sensing device based on principles of electricity, magnetism or radiation, to detect foreign materials accumulated in the removal section.

14. A screw conveyor as claimed in claim 1, wherein there are at least two main screws and a removal screw all on one axis, the removal screw being at the center in the input compartment with threads adapted and deposed to move the material to the main screws, the said removal screw being separated from the two main screws by collars.

15. A screw conveyor as claimed in claim 14, said input compartment including a partition dividing said input compartment in two parts, with removal screws being disposed in each part to drive material to the main screws.

16. A screw conveyor as claimed in claim 2, wherein there are at least two parallel main and removal screws.

17. A screw conveyor as claimed in claim 2, wherein at least part of the threads of the removal and main screws are interrupted, the separated elements having the shape of paddles, rods or pins.

References Cited

UNITED STATES PATENTS

| 430,031 | 6/1890 | Jones | 209—12 X |
|---|---|---|---|
| 1,128,043 | 2/1915 | Quigley | 110—110 X |
| 1,617,117 | 2/1927 | Jaxon | 209—123 X |
| 1,193,016 | 8/1916 | Heyl | 110—110 X |
| 2,127,726 | 8/1938 | Goetz | 198—64 |
| 2,225,215 | 12/1940 | Guthrie | 198—64 |
| 2,233,707 | 3/1941 | Nelson | 198—64 |
| 2,455,750 | 12/1948 | Freed | 198—64 |
| 2,493,591 | 1/1950 | Newton | 198—40 X |
| 3,178,011 | 4/1965 | Oshanyk | 198—207 |

M. HENSON WOOD, JR., *Primary Examiner.*

J. P. MULLINS, *Assistant Examiner.*